Patented Jan. 30, 1951

2,539,428

UNITED STATES PATENT OFFICE 2,539,428

3,3'-DITHIOLISOBUTYRIC ACID

Eugene F. Jansen, Berkeley, Calif., assignor to United States of America as represented by the Secretary of Agriculture No Drawing. Application April 15, 1949,
Serial No. 87,823

10 Claims. (Cl. 260—526)

(Granted under the act of March 3, 1883, as
amended April 30, 1928; 370 O. G. 757)

This application is made under the act of March 3, 1883, as amended by the act of April 30, 1928, and the invention hereindescribed, if patented in any country, may be manufactured and used by or for the Government of the United States of America for governmental purposes throughout the world without the payment to me of any royalty thereon.

This invention relates to organic sulphur compounds, in particular to sulphur-containing derivatives of isobutyric acid, and has among its objects the provision of processes for isolating an organic disulphide compound contained in asparagus and for converting this material, or other raw materials, into 3,3'-dithiolisobutyric acid and derivatives thereof. Other objects will be apparent from the description of the invention.

The products of the invention, which are novel sulphur-containing derivatives of isobutyric acid, may be represented by the formulae

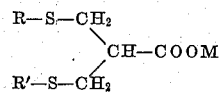

and

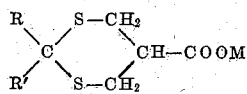

wherein R and R' are radicals selected from the group consisting of hydrogen and hydrocarbon, and M is a cation.

One phase of this invention involves the provision of a process for isolating an organic disulphide compound from asparagus. This compound, the existence of which has not been heretofore known, is useful as an intermediate for chemical syntheses and for other purposes as will appear hereinafter. The process by which this disulphide compound is isolated involves extracting asparagus juice with an organic polar solvent whereby a polar solvent extract is obtained which contains the disulphide compound together with some impurities. This extract is then further treated to separate the desired compound from the impurities. It has been found that the disulphide compound has a carboxylic group and in its acid form is preferentially soluble in organic solvents, whereas in its salified or neutralized form it is preferentially soluble in water. Therefore, further purification is effected by carrying out one or more transfers from solution in organic solvent to solution in water and vice versa. In transferring from organic solvent to water, basic conditions are employed, whereas for the reverse transfer, acidic conditions are employed. The number of transfers to be carried out depends, of course, on the degree of purity desired. For some purposes, it is sufficient to transfer the compound from organic solvent to water and then back to organic solvent, and then evaporate the solvent to obtain the product. In other cases where highly purified product is desired, the transfers can be repeated to eliminate all impurities. For complete and exhaustive purification, the following procedure is used: Asparagus juice is extracted with a polar solvent whereby a polar solvent extract is obtained which contains the desired organic disulphide compound plus impurities such as phenolic compounds, non-acidic compounds, and so forth. This extract is then extracted with an aqueous alkaline solution. By this treatment the disulphide compound is transferred to the aqueous phase, but various impurities, particularly phenolic compounds, remain in the solvent phase. The aqueous extract is then acidified and extracted with a polar solvent whereby the disulphide compound is transferred to the solvent phase and a further elimination of impurities is effected. The solvent phase is then concentrated, preferably under vacuum, to remove all the water therefrom. The concentrated solution is then mixed with an excess of an organic fat solvent whereby impurities low in sulphur content are precipitated. The disulphide compound is again transferred to aqueous solution by extraction with aqueous alkaline solution and this aqueous phase, after acidification, is extracted with an organic fat solvent. The resulting extract contains the disulphide compound in substantially pure form and it can be recovered in solid form by evaporation of the solvent.

In the foregoing isolation technique many alternative materials may be used. For example, butanol (i. e., normal butyl alcohol) is the preferred polar solvent; however, other polar solvents can be employed which are miscible with water to the extent of about 5 percent to about 20 percent, as for example, isobutyl alcohol, secondary butyl alcohol, n-amyl alcohol, isoamyl alcohol, and so forth.

In the transfers to aqueous solution the alkaline material is preferably sodium bicarbonate, but other similar moderate alkaline materials are suitable, such as potassium bicarbonate, potassium carbonate, sodium carbonate, borax, potassium tetraborate, ammonium hydroxide, ammonium carbonates, and so forth.

In the acidification steps, any water-soluble acid may be used, as for example, hydrochloric, sulphuric, phosphoric, acetic, and so forth.

As the organic fat solvent, benzene is preferred, but toluene, xylenes, carbon tetrachloride, chloroform, ethylene dichloride, ether, hexane, octane, and mixtures of hydrocarbons such as gasoline, petroleum ether, Stoddard solvent, benzine, naphtha, and other organic fat solvents may be used.

The disulphide compound isolated from asparagus juice is a yellow amorphous material which contains the radical

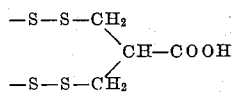

Since it contains a carboxylic radical, it forms salts just as do other carboxylic acids. It is insoluble in water but soluble in aqueous alkaline solutions. It is also soluble in many organic solvents such as alcohol, benzene, ether, and so forth. It contains approximately 43 percent carbon, 6 percent hydrogen, and 30 percent sulphur and its neutral equivalent is 360—this figure signifying that each 360 grams thereof contains one carboxylic radical. The material tends to polymerize on standing either as such or in solution, becoming insoluble in organic solvents.

Another phase of this invention involves the preparation of 3,3'-dithiolisobutyric acid and the salts thereof. This acid has the chemical formula

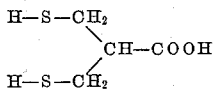

and can be prepared in several ways, as for example, by reduction of the asparagus disulphide compound heretofore described, or by reaction of a 3,3'-dihaloisobutyric acid with an inorganic hydrosulphide.

With regard to the first-mentioned method, the preferred technique involves dissolving the asparagus disulphide compound in a suitable inert solvent, as for example, anhydrous liquid ammonia, and then reducing it with an alkali metal such as sodium or potassium. The alkali metal derivative of the 3,3'-dithiolisobutyric acid so formed is then converted into the acid itself by addition of a mineral acid such as hydrochloric, sulphuric, and so forth. If it is desired to obtain a purified product, the acidified reaction mass is extracted with an inert organic solvent such as benzene, toluene, xylene, petroleum naphtha, hexane, and so forth, and the dithiol acid recovered therefrom by concentrating and cooling. This procedure is shown in Example II herein, and the reactions involved in this synthesis are illustrated by the following equation

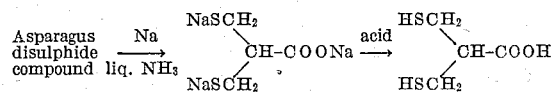

The other method for preparing 3,3'-dithiolisobutyric acid involves reacting a 3,3'-dihaloisobutyric acid with an inorganic hydrosulphide. For example, 3,3'-diiodoisobutyric acid is reacted with barium hydrosulphide whereby the iodo groups are replaced by thiol (SH) groups. Thus:

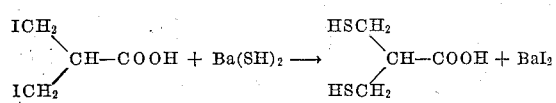

3,3'-dithiolisobutyric acid can be converted into its salts by reaction with suitable hydroxides, carbonates, or other inorganic compounds. For example, the sodium salt of the dithiol acid can be prepared by reacting it with sodium hydroxide or sodium carbonate. In the same manner any desired salt can be prepared by the usual neutralization or metathetic techniques. Salt formation is not limited to inorganic salts as salts may also be made with organic bases such as amines, quaternary ammonium compounds, ternary sulphonium compounds, for example, methyl amine, triethanol amine, glyceryl amine, aniline, morpholine, brucine, strychnine, pyridine, piperidine, tetraethyl ammonium hydroxide, dodecyl trimethyl ammonium hydroxide, triethyl sulphonium hydroxide, and so forth.

Another phase of the invention involves the provision of dialkyl 3,3'-dithiolisobutyric acid, the salts thereof, and methods for preparing these compounds. These compounds can be prepared in several ways, as for example, by alkylation of the alkali metal derivative of 3,3'-dithiolisobutyric acid or by alkyl-mercaptization of a 3,3'-dihaloisobutyric acid.

With regard to the first-mentioned method, the alkali metal derivative of 3,3'-dithiolisobutyric acid is reacted with an alkyl halide, or equivalent alkylating agent, such as a dialkyl sulphate. The alkali metal derivative which is used in this synthesis can be prepared by alkali metal reduction of the asparagus disulphide compound or by treatment of 3,3'-dithiolisobutyric acid with an alkali metal. The reaction involving alkylation of the sodium derivative of 3,3'-dithiolisobutyric acid is described in Example IV herein and is shown in the following equation:

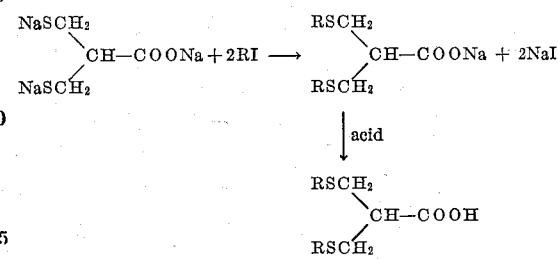

wherein R is an alkyl radical.

It is apparent that by suitable selection of the alkylating agent any desired alkylated derivative may be synthesized. For example, the alkylating agent may be methyl iodide, methyl bromide, ethyl iodide, ethyl bromide, propyl iodide, propyl bromide, butyl iodides, butyl bromides, and so forth.

The method of preparing alkyl derivatives of 3,3'-dithiolisobutyric acid by reaction of a 3,3'-dihaloisobutyric acid with an alkali metal mercaptide is described in Example V and can be illustrated by the following equation:

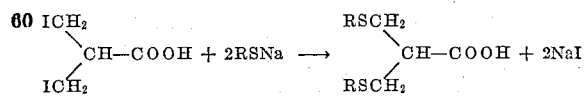

wherein R is an alkyl radical.

It is evident from the above equation that by suitable choice of the mercaptide reactant any desired alkyl derivative may be synthesized. For example, sodium methyl mercaptide, sodium ethyl mercaptide, sodium propyl mercaptide, sodium isopropyl mercaptide, sodium butyl mercaptides, and so forth, may be employed. Potassium mercaptides can be used in place of sodium mercaptides. With regard to the other reactant, dibromo- or dichloroisobutyric acid can be used in place of the iodine derivative.

Another aspect of the invention concerns the preparation of 1,3-dithiane-5-carboxylic acid, its salts and the 2-substituted derivatives thereof. These compounds are prepared by reacting 3,3'-dithiolisobutyric acid with an aldehyde or ketone, preferably in the presence of an inorganic acid such as hydrochloric, sulphuric or hydrobromic acid. The reactions whereby these compounds are produced can be illustrated by the following equations:

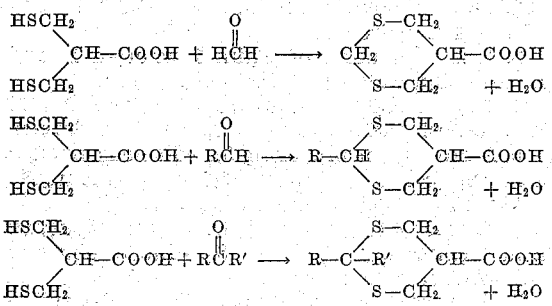

wherein R and R' are hydrocarbon radicals.

It is evident from the above equations that any desired derivative can be prepared by selection of the proper aldehyde or ketone. Thus, to prepare 1,3-dithiane-5-carboxylic acid the proper reactant is formaldehyde. This synthesis is illustrated by Example III herein. To prepare 1,3-dithiane-2,2-dimethyl-5-carboxylic acid the proper reactant is acetone; to prepare 1,3-dithiane-2-methyl-5-carboxylic acid the proper reactant is acetaldehyde. Use may be made of any aldehyde or ketone such as propionaldehyde, butyraldehyde, isobutyraldehyde, valeraldehydes, benzaldehyde, methyl ethyl ketone, methyl propyl ketone, diethyl ketone, acetophenone, and so forth.

The dialkyl derivatives of 3,3'-dithiolisobutyric acid as well as the dithiane carboxylic acids can be converted into salts in the same manner and with the same materials as set forth above in connection with salts of 3,3'-dithiolisobutyric acid itself.

The compounds prepared in accordance with this invention are useful as intermediates for the preparation of diverse types of derivatives. Moreover, the compound 3,3'-dithiolisobutyric acid and its salts are useful as anti-lewisite agents and as regulators for enzymic reactions.

The following examples are illustrative of the invention:

EXAMPLE I

*Isolation of the asparagus disulphide compound*

A supply of asparagus concentrate was procured. This concentrate was prepared by evaporating the juice pressed from asparagus butts until the solids content was 62.5 percent. A 9 gallon sample of the concentrate (40 kilos) was diluted with an equal weight of water. This solution, which had a pH of 4.5, was extracted with 7 gallons of butanol by agitation for 20 minutes. After standing for 2 hours the liquid was centrifuged, the butanol phase thus being separated from the aqueous phase. The butanol phase was then extracted with 3 gallons of dilute aqueous sodium bicarbonate solution (4 lbs. $NaHCO_3$ per gallon). The bicarbonate extract was separated and acidified to pH 3 with phosphoric acid, and extracted with 4 gallons of butanol. The butanol extract was evaporated at 35° C. and under vacuum to a volume of 270 ml. This concentrate was filtered and to it was added 1300 ml. of benzene, and the precipitated material removed by filtration. The butanol-benzene solution was then extracted with 550 ml. of 5 percent sodium bicarbonate solution; the bicarbonate solution was washed with benzene, and then acidified to pH 2 with sulphuric acid. Some sticky black insoluble material was removed by filtration and centrifugation. The bicarbonate solution was then extracted with 3 liters of ether and the ether extract dried over anhydrous sodium sulphate and then evaporated to a volume of 100 ml. This ether solution contained 31.7 grams of the disulphide compound.

EXAMPLE II

*Reduction of the asparagus disulphide compound to 3,3'-dithiolisobutyric acid*

To 175 ml. of liquid ammonia was added 13 ml. of the ethereal solution prepared in accordance with Example I above, this ether solution containing 4.1 grams of the disulphide compound.

Metallic sodium was added in small pieces until a relatively permanent blue color was obtained. As the reduction proceeded the material went into solution. The ammonia was allowed to evaporate spontaneously. The residue was taken up in 40 ml. of water and quickly acidified with concentrated hydrochloric acid to pH 2. This aqueous material was frozen, then dried under vacuum. The residue was allowed to stand overnight with 600 ml. of petroleum ether (B. P. 92–100°) and then re-extracted with 200 ml. of petroleum ether. The combined petroleum ether extract was cooled to —18° for several days. Colorless crystals of 3,3'-dithiolisobutyric acid separated. Upon recrystallization from 800 ml. of petroleum ether, 1.97 grams of 3.3'-dithiolisobutyric acid was obtained corresponding to a 48 percent yield on a solid basis. The product melted at 61–62°.

Analysis: $C_4H_8O_2S_2$

Calculated: C, 31.56; H, 5.30; S, 42.12, mol. wt. 152

Found: C, 32.3; H, 5.30; S, 41.6, neutral equivalent 152; mol. wt. 155; equivalent weight by —SH titration 77.

EXAMPLE III

*Preparation of 1,3-dithiane-5-carboxylic acid*

To a solution of 0.25 grams (.0016 mole) of 3,3'-dithiolisobutyric acid in 50 ml. of 0.1 normal hydrochloric acid was added 0.14 ml. of formalin (.0019 mole of formaldehyde) and the reaction mixture was refluxed for two hours. The reaction mixture was then evaporated to dryness under vacuum whereupon a crystalline residue was obtained. The crystals were recrystallized from 12 ml. of hot water and a yield of 0.19 grams (70 percent of theoretical) of 1,3-dithiane-5-carboxylic acid was obtained. The product had a melting point of 146–148° C.

Analysis: $C_5H_8O_2S_2$

Calculated: C, 36.56%; H, 4.91%; S, 39.04%; mol. wt. 164

Found: C, 36.7%; H, 5.04%; S, 39.8%; neutral equivalent 161.

EXAMPLE IV

*Preparation of dimethyl-3,3'-dithiolisobutyric acid from the disulphide compound*

A metallic sodium reduction of 15 ml. of the ethereal solution of the disulphide compound was carried out as described in Example II. After the reduction was complete, 15 ml. of methyl iodide were slowly added to the liquid ammonia solution. The ammonia was allowed to evaporate spontaneously. The residue was dissolved in water, acidified with hydrochloric acid to pH 2, and evaporated under vacuum to dryness. The residue was extracted with 400 ml. of benzene, and the benzene evaporated, leaving 3.14 grams of an oily product. This oil was dissolved in 200 ml. of petroleum ether (B. P. 92–100° C.) at 25° C. and cooled to −18° C. whereupon the dimethyl-3,3'-dithiolisobutyric acid crystallized out in elongated rectangles. The product was obtained in a yield of 60 percent and had a melting point of 23.5–25° C.

Analysis: $C_6H_{12}O_2S_2$

Calculated: C, 39.97%; H, 6.71%; S, 35.57%; $CH_3$, 16.67%; mol. wt. 180

Found: C, 40.0%; H, 6.83%; S, 34.9%; $CH_3$, 14.3%; neutral equivalent 179, mol. wt. 183.

EXAMPLE V

*Preparation of dimethyl-3,3'-dithiolisobutyric acid from 3,3'-diiodoisobutyric acid*

To 125 ml. of a cold ethanol solution of sodium ethylate prepared by reaction of 0.5 gram (0.022 mole) of sodium with ethanol was added 9.5 grams (0.195 mole) of methyl mercaptan. After a few minutes, the resulting solution of sodium methyl mercaptate was mixed with 2 grams (0.006 mole) of 3,3'-diiodoisobutyric acid and the mixture refluxed for 6 hours. After acidification, the reaction mixture was evaporated to dryness under vacuum. The residue was extracted with 100 ml. of warm petroleum ether (B. P. 92–100° C.) and the extract filtered. On cooling the filtrate to −18° C. overnight, an oil separated. This oil was removed and the mother liquor was evaporated to a volume of 25 ml. On cooling again to −18° C., 0.311 grams (30 percent yield) of crystalline dimethyl-3,3'-dithiolisobutyric acid was obtained. The melting point was 23.5° to 25° C.

Analysis: $C_6H_{12}O_2S_2$

Calculated: C, 39.97%; H, 6.71%; S, 35.57%; $CH_3$, 16.67%; mol. wt. 180

Found: C, 39.8%; H, 6.76%; S, 35.0%; $CH_3$, 14.3%; neutral equivalent 179.

Having thus described the invention, what is claimed is:

1. A compound of the formula

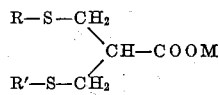

wherein R and R' are radicals selected from the group consisting of hydrogen and hydrocarbon, and M is a cation.

2. The compound of claim 1 wherein R, R' and M are each hydrogen.

3. The compound of claim 1 wherein R and R' are alkyl radicals and M is hydrogen.

4. The compound of claim 1 wherein R and R' are both methyl groups, and M is hydrogen.

5. A process for preparing 3,3'-dithiolisobutyric acid comprising reacting a 3,3'-dihaloisobutyric acid with an inorganic hydrosulphide.

6. A process for preparing 3,3'-dithiolisobutyric acid comprising reacting 3,3'-diiodoisobutyric acid with barium hydrosulphide.

7. A process for preparing a dialkyl derivative of 3,3'-dithiolisobutyric acid comprising reacting a 3,3'-dihaloisobutyric acid with an alkali metal mercaptide.

8. A process for preparing dimethyl-3,3'-dithiolisobutyric acid comprising reacting 3,3'-diiodoisobutyric acid with sodium methyl mercaptide.

9. A process for preparing a dialkyl derivative of 3,3'-dithiolisobutyric acid comprising reacting the alkali metal derivative of 3,3'-dithiolisobutyric acid with an alkyl halide.

10. A process for preparing dimethyl-3,3'-dithiolisobutyric acid comprising reacting the alkali metal derivative of 3,3'-dithiolisobutyric acid with methyl iodide.

EUGENE F. JANSEN.

REFERENCES CITED

The following references are of record in the file of this patent:

UNITED STATES PATENTS

| Number | Name | Date |
|---|---|---|
| 2,183,860 | Coltof | Dec. 19, 1939 |
| 2,477,327 | Blake | July 26, 1949 |